Dec. 25, 1962 R. R. DOUGLAS ETAL 3,069,927
TEMPERATURE COMPENSATING TANGENT
Filed April 3, 1961
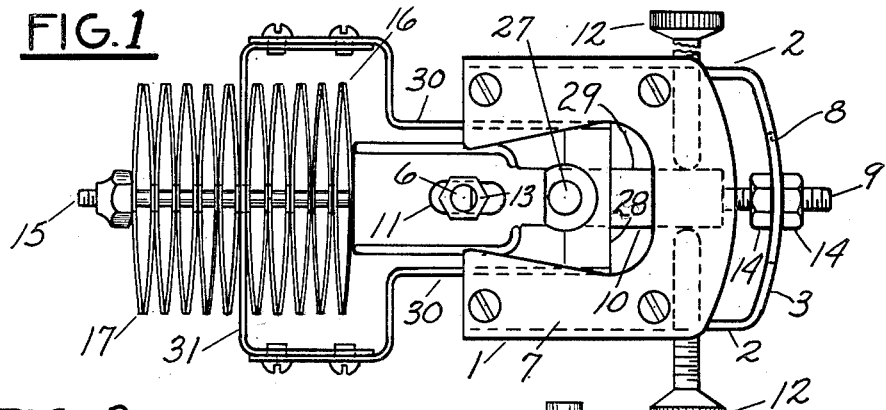
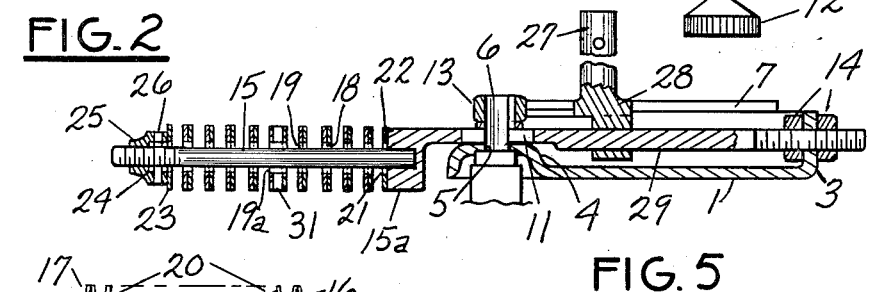
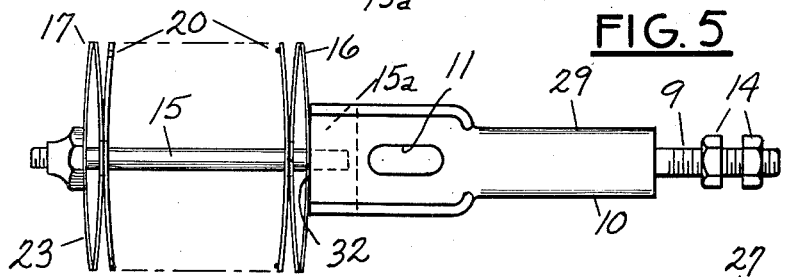
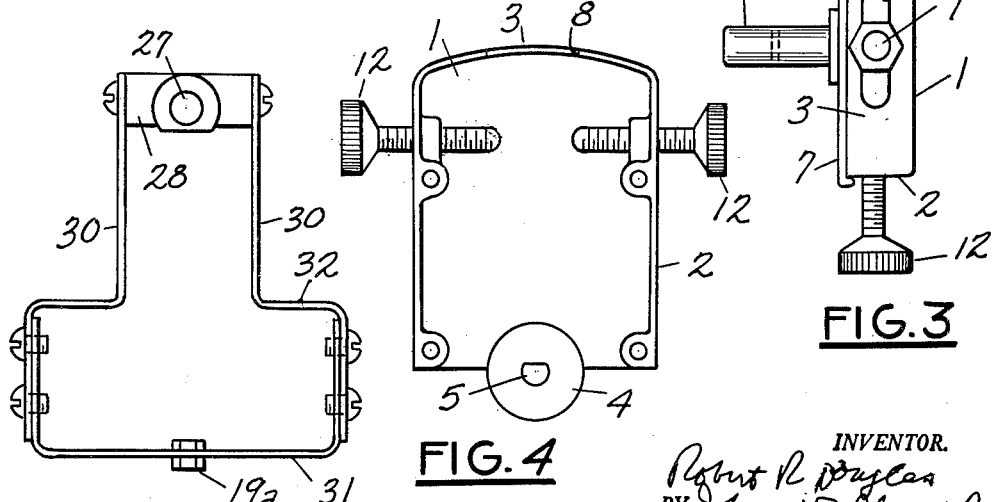

3,069,927
TEMPERATURE COMPENSATING TANGENT

Robert R. Douglas and John W. F. Blizard, Jr., Philadelphia, Pa., assignors to American Meter Company, Incorporated, Philadelphia, Pa., a corporation of Delaware
Filed Apr. 3, 1961, Ser. No. 100,183
7 Claims. (Cl. 74—600)

This invention is a temperature compensating tangent for fluid meters which adjusts the stroke of the meter diaphragms in accordance with the temperature of the fluid. One use is in gas meters in which a tangent stroke adjustment causes the registration to correspond to a basic volume of gas. The construction is adapted to large sized meters in which a considerable adjustment in stroke is required.

In the drawing, FIG. 1 is a plan view of the tangent, FIG. 2 is a longitudinal section, FIG. 3 is an end view of the tangent, FIG. 4 is a plan view of the tangent bracket, FIG. 5 is a plan view of the tangent guide member, and FIG. 6 is a plan view of the frame carrying the wrist pin.

In the drawing, 1 indicates a bracket having upstanding side and end walls 2 and 3 and a projection 4 with a non circular opening 5 which receives the meter crankshaft 6. The top of the bracket is covered by a horseshoe shaped cover plate 7.

In the end wall 3 of the bracket is a slot 8 which receives the threaded end 9 of a guide member 10. The guide member 10 is adjustable relative to the bracket both longitudinally and angularly. The longitudinal adjustment of the guide member with respect to the bracket is provided by a slot 11 in the central portion of the guide member which fits over the crankshaft 6. The angular adjustment is provided by screws 12 in the side walls 2 of the bracket which holds the screws so that they engage opposite sides of the guide member. Upon loosening the nut 13 on the crankshaft and the nuts 14 on the threaded end 9 of the guide member, the guide member can be moved longitudinally along a centerline through the crankshaft and can also be pivoted angularly about the crankshaft. Upon reaching the desired position, the guide member is anchored in place by tightening the screws 12 and the nuts 13 and 14.

At one end of the guide member is a spindle 15 fixed in a boss 15a. On the spindle are stacked two sets of pairs of bimetal elements 16 and 17. The bimetal elements 16 are arcuate strips with non circular center openings 18 which receive bushings 19 floatable about the spindle 15. The abutting ends of the elements 16 are provided with interfitting projections and perforations 20 which prevent relative rotation of the elements about the axis of the spindle. In the elements 16, the low expansion metal is on the outside so that as the temperature increases, the elements flatten and the centers become closer together. In order to make expansion and contraction of the elements take place smoothly and linearly with temperature, the elements are of spherical contour, having the shape of a section of a segment of a sphere with the centers of the elements lying on a diameter of the sphere and with the ends of the elements lying in a plane perpendicular to the same diameter of the sphere. The abutting ends of the elements contact throughout their width and there is no change in the contact. If the elements 16 were curved in one direction only, the linearity of response would be interfered with since temperature changes cause changes in curvature both lengthwise and crosswise of the element.

The pairs of thermostatic elements 16 are arranged at one end of the spindle 15. The pairs of thermostatic elements 17 are arranged at the opposite end of the spindle 15 and are of similar construction except that the low expansion metal is on the inside of the elements. This means that as the temperature increases, the elements 17 have increased curvature or arching while the elements 16 have decreased curvature or arching.

The interlocking projections and perforations 20 in the ends of the elements 16 and 17 prevent relative rotation of the individual pairs of elements. Adjacent pairs of elements are kept in alignment by the bushings 19 which have non circular outer surfaces fitting in non circular openings 18 in the elements. At or near the center of the spindle, the bushing 19a is of greater length than the bushings 19 so as to pass through and be anchored with cross member 31 which lies between the thermostatic elements 16 and 17. At the boss 15a of the guide member, the thermostatic element 22 is non rotatably anchored by a non circular projection 21 on the guide member. At the opposite end of the spindle the element 23 is fixed to a bushing 24 which causes the element to be non rotatably anchored to the spindle by a nut 25 and a pin 26. The thermostatic elements 16 and 17 are accordingly held in alignment with each other and with the boss 15a and yet are free to slide along the spindle as required with temperature changes.

The wrist pin 27 is integral with a block 28, slidably guided on section 29 of the guide member 10. One end of frame members 30 is fixed to opposite sides of block 28; the other end of the frame members is connected to a cross member 31 which lies between the bimetallic elements 16 and 17. The cross member 31 is non rotatably attached to elements 16 and 17 by bushing 19a, which is slidable on the spindle. The section 29 of the guide member and the spindle 15 combine to guide the wrist pin for movement along a center line through the crankshaft 6 to change the length of the tangent stroke. The amount that the stroke is changed is controlled by the temperature responsive bimetallic elements 16 and 17. These elements are stacked on the spindle 15 with one kind of element 16 on one side of the cross member 31 and the other kind of element 17 on the opposite side of the cross member. The element 22 at one end of the stack abuts a shoulder 32 on the boss 15a. The element 23 at the opposite end of the stack abuts the nut 25. By this arrangement, the centers of the bimetallic elements remote from each other are arranged in thrust relation to the guide member 10 while the centers of the bimetallic elements adjacent each other are arranged in thrust relation to the cross member 31. The bimetallic elements accordingly transmit thrust to the cross member 31, through the frame member 30, to the wrist pin 27 along the longitudinal centerline of the guide member 10. As temperature changes, one group of elements expands an amount equal to the contraction of the other. That is, as the elements 17 expand, the elements 16 contract, and vice versa. The response to changes in temperature is linear due to both the spherical contour of the bimetal elements and to their freedom from restraint; this freedom allows independent movement of each bimetal element and results in a maximum and predicted excursion.

With gas meters, as the temperature of the gas being measured increases, the gas expands and contains fewer heat units per unit volume. Since a gas meter accurately measures gas volume, the meter must be recalibrated to a reference volume to account for otherwise lost heat units; therefore, the meter must be operated at a lower speed. This speed reduction requires a longer tangent stroke which is accomplished by an expansion of the bimetallic elements 17 and an equal amount of contraction of bimetallic elements 16, moving the wrist pin 27 further away from the crankshaft 6. This movement is not resisted by the thermostatic elements 16 because the temperature change which causes expansion of the elements 17 causes contraction of the elements 16. Likewise, as the temperature of the gas being measured decreases, the gas shrinks and has a greater number of heat units per unit volume. In this instance, the wrist pin should move closer to the crankshaft to shorten the tangent stroke. This adjustment is accomplished by the bimetallic elements 16 which expand while bimetallic elements 17 contract as the temperature decreases and move the wrist pin toward the crankshaft. Again, this movement is not resisted by the bimetallic elements 17 because these elements shrink or contract as the bimetallic elements 16 expand.

What is claimed as new is:

1. A temperature compensating tangent having a bracket for connection to a crankshaft, a guide member having a spindle extending along a centerline through the crankshaft, a frame carrying a wrist pin and guided on said guide member for movement along said spindle, a pair of bimetal elements with ends abutting and with centers arched away from each other and slidable on the spindle, another pair of bimetal elements with ends abutting and with centers arched away from each other and slidable on the spindle, one of the pairs having the low expansion metal on the inside of the elements and the other of the pairs having the low expansion metal on the outside of the elements, the contour of each of the bimetal elements being a section of a segment of a sphere with the center lying on a diameter of the sphere and with the ends lying in a plane perpendicular to the same diameter of the sphere, said pairs being spaced along said centerline, a part in thrust relation to the centers of the elements of both pairs remote from each other, another part in thrust relation to the centers of the elements of both pairs adjacent each other, and one of said parts being connected to said guide member and the other of said parts being connected to said frame.

2. A temperature compensating tangent having a bracket for connection to a crankshaft, a guide member having a spindle extending along a centerline through the crankshaft, a frame carrying a wrist pin and guided on said guide member for movement along said spindle, a pair of arcuate bimetal strips with abutting ends provided with interfitting projections and depressions and with centers arched away from each other and having an opening slidably receiving the spindle, another pair of arcuate bimetal strips with abutting ends provided with interfitting projections and depressions and with centers arched away from each other and having an opening slidably receiving the spindle, one of the pairs having the low expansion metal on the inside and the other of the pairs having the low expansion metal on the outside, said pairs being stacked on the spindle, a part in thrust relation to the centers of the elements of both pairs remote from each other, another part in thrust relation to the centers of the strips of both pairs adjacent each other, and one of said parts being connected to said guide member and the other of said parts being connected to said frame.

3. A temperature compensating tangent having a bracket for connection to a crankshaft, a guide member having a spindle extending along a centerline through the crankshaft, a frame carrying a wrist pin and guided on said guide member for movement along said spindle, a pair of arcuate bimetal elements with ends abutting and with centers arched away from each other and slidable on the spindle, another pair of arcuate bimetal elements with ends abutting and with centers arched away from each other and slidable on the spindle, one of the pairs having the low expansion metal on the inside and the other of the pairs having the low expansion metal on the outside, said pairs being spaced along said centerline, a part in thrust relation to the centers of the elements of both pairs remote from each other, another part in thrust relation to the centers of the elements of both pairs adjacent each other, and one of said parts being connected to said guide member and the other of said parts being connected to said frame.

4. A temperature compensating tangent having a bracket for connection to a crankshaft, a guide member having a spindle extending along a centerline through the crankshaft, a frame carrying a wrist pin and guided on said guide member for movement along said spindle, a pair of arcuate bimetal strips with abutting ends provided with interfitting projections and depressions and with centers arched away from each other and the bimetal strips having non circular openings through which the spindle extends, another pair of arcuate bimetal strips with abutting ends provided with interfitting projections and depressions and with centers arched away from each other and the bimetal strips having a non circular opening through which the spindle extends, one of the pairs having the low expansion metal on the inside and the other of the pairs having the low expansion metal on the outside, said pairs being stacked on the spindle, a part in thrust relation to the centers of the strips of both pairs remote from each other, another part in thrust relation to the centers of the strips of both pairs adjacent each other, bushings slidable on the spindle and non rotatably anchored in said openings, means non rotatably anchoring the strips to the parts in thrust relation thereto, and one of said parts being connected to said guide member and the other of said parts being connected to said frame.

5. A temperature compensating tangent having a bracket for connection to a crankshaft, a guide member having a spindle extending along a centerline through the crankshaft, a frame carrying a wrist pin and guided on said guide member for movement along said spindle, a pair of arcuate bimetal elements with abutting ends provided with interfitting projections and depressions and with centers arched away from each other and having a non circular opening through which the spindle extends, another pair of arcuate bimetal strips with abutting ends provided with interfitting projections and depressions and with centers arched away from each other and having a non circular opening through which the spindle extends, one of the pairs having the low expansion metal on the inside and the other of the pairs having the low expansion metal on the outside, said pairs being stacked on the spindle, a part in thrust relation to the centers of the strips of both pairs remote from each other, another part in thrust relation to the centers of the strips of both pairs adjacent each other, bushings slidable on the spindle and non rotatably anchored in said openings, each of said parts having a non circular portion fitting in one of said non circular openings to non rotatably anchor the strips and the parts in thrust relation thereto.

6. A temperature compensating device for fluid meters and the like including an unrestrained temperature responsive structure, said temperature responsive structure comprising a spindle, a pair of bimetal elements with ends abutting and with centers arched away from each other and slidable on the spindle, another pair of bimetal elements with ends abutting and with centers arched away from each other and slidable on the spindle, one of the pairs having the low expansion metal on the inside of the elements and the other of the pairs having the low expansion metal on the outside of the elements, the contour of each of the bimetal elements being a section of a segment of a sphere with the center lying on a diameter of the sphere and with the ends lying in a plane perpendicular to the same diameter of the sphere, said pairs being spaced along said spindle, a connection to one of said parts in thrust relation to the centers of the elements of both pairs remote from each other, and a connection to the other of said parts in thrust relation to the centers of the elements of both pairs adjacent each other.

7. A temperature responsive structure comprising two parts supported for unrestrained relative movement and a temperature responsive structure for adjusting the relative position of said parts, said temperature responsive structure comprising, a spindle, a pair of arcuate bimetal strips with abutting ends provided with interfitting projections and depressions and with centers arched away from each other and having an opening slidably receiving the spindle, another pair of arcuate bimetal strips with abutting ends provided with interfitting projections and depressions and with centers arched away from each other and having an opening slidably receiving the spindle, one of the pairs having the low expansion metal on the inside and the other of the pairs having the low expansion metal on the outside, said pairs being stacked on the spindle, said strips having the shape of a section of a segment of a sphere with the center lying on a diameter of the sphere and with ends of the strips lying in a plane perpendicular to the same diameter of the sphere, a connection to one of said parts in thrust relation to the centers of the elements of both pairs remote from each other, and a connection to the other of said parts in thrust relation to the centers of the elements of both pairs adjacent each other.

References Cited in the file of this patent

UNITED STATES PATENTS

| | | |
|---|---|---|
| 2,296,485 | Whitworth | Sept. 22, 1942 |
| 2,778,224 | Douglas | Jan. 22, 1957 |